United States Patent [19]

Mase et al.

[11] Patent Number: 5,449,123
[45] Date of Patent: Sep. 12, 1995

[54] METHOD AND APPARATUS FOR PULVERIZING SCRAPPED FIBER REINFORCED THERMOSETTING PLASTIC MATERIALS

[75] Inventors: Tomitaka Mase, Yamato; Toshihiko Asada, Tokyo, both of Japan

[73] Assignees: Asaoka Co., Ltd.; Asahi Diamond Industrial Co., Ltd., both of Tokyo, Japan

[21] Appl. No.: 133,650

[22] Filed: Oct. 7, 1993

Related U.S. Application Data

[63] Continuation-in-part of Ser. No. 817,760, Jan. 8, 1992, abandoned.

Foreign Application Priority Data

Mar. 13, 1991 [JP] Japan .................. 3-126957

[51] Int. Cl.$^6$ .......................................... B02C 19/12
[52] U.S. Cl. .............................. 241/30; 241/280; 241/293
[58] Field of Search .............. 241/290, 293, 294, 30; 51/215 CP, 215 H, 293, 206 R; 451/334, 335, 541

[56] References Cited

U.S. PATENT DOCUMENTS 4,114,322  9/1978  Greenspan ...................... 241/293
4,666,093  5/1987  Lajunen et al. ................... 241/280

Primary Examiner—Douglas D. Watts
Attorney, Agent, or Firm—Kane, Dalsimer, Sullivan, Kurucz, Levy, Eisele and Richard

[57] ABSTRACT

A method and apparatus for pulverizing into fine powder in one step scrapped difficult to crush plastics of fiber reinforced thermosetting plastics by using a rotating diamond wheel having diamond grits of rough grain size of more than 270 mesh on the outer surface, a pushing unit to press plastic materials against the diamond wheel above and a powder collector.

2 Claims, 3 Drawing Sheets

METHOD AND APPARATUS FOR PULVERIZING SCRAPPED FIBER REINFORCED THERMOSETTING PLASTIC MATERIALS

This is a CIP of Ser. No. 07/817,760 filed Jan. 8, 1992, now abandoned.

BACKGROUND OF THE INVENTION

The invention of this application relates to a pulverizing method and apparatus for effectively pulverizing very difficult to crush scrapped fiber reinforced thermosetting plastic (herein referred to as FRP) generated during production into powder of appropriate size and distribution for the purpose of recycling.

Due to the excellent characteristics of FRP, such as superior hardness, lightness, easy forming of complex configuration parts, FRP is being used actively by various industries and its production volume is increasing yearly throughout the world.

However, in spite of the volume of FRP scraps generated in the production process and FRP products sold in the markets being discarded increasing yearly, nearly most of these are buried in the ground or incinerated but in either case, these disposal methods are unsafe from the point of protection of the environment. Furthermore, no effective recycling is being carried out at all.

By making these scrapped FRP materials into fine powder, it is possible to regenerate FRP into new materials. In other words, not only can the powder be reused by mixing it with virgin resin to form FRP products, it can also be added to other materials such as cement mortar, concrete, paint, and, because of the effects of the above-mentioned special characteristics of FRP has, it is possible to make products having characteristics not found before and consequently, the range of applications is widening in many industries.

The so-called fiber reinforced plastic is resins containing glass fiber as a reinforcing material (GFRP), carbon fiber (CFRP) and organic fiber and as these scrapped materials have excellent durability, high strength, and lightness, they are difficult to crush and it is very difficult to cut the fibers.

The type of thermosetting resin varies depending on the purpose but among these are middle corrosion resist unsaturated polyester resin of the iso group, high corrosion resist unsaturated polyester resin of the bisphenol group, oxidation resist unsaturated polyester resin of the acid group and also, high corrosion resist epoxy resin, etc. For example molded products of GFRP has been widely used as industrial structural materials such as transportation apparatus (automobiles, trains), construction materials (flat/corrugated sheets, sewage tanks, toilet bowls, sundries, helmets, cooling towers, bath units,) etc.

Generally, methods of pulverizing material into powder are roughly classified into (1) crushing by impact stress and (2) breaking up by compression; there are numerous pulverizing apparatus utilizing these processes which have been designed and commercialized. However, there has been no existing pulverizing method or apparatus which satisfied the purpose of effectively pulverizing non-crushable, unbreakable FRP materials to produce an uniform grained powder.

For example, regarding scrapped FRP materials in Japan, the trimming refuse, polymer residues, molding rejects, etc. generated in production are practically all hauled away by outside industrial waste disposal companies for disposal in land fills and these increased cost burdens are oppressing manufacturing business operations. For the users, the volume of scrapped material is positively increasing in housing reforms, etc. In the case of unit bathrooms, 100,000–150,000 yearly and more than 10,000 tons yearly of flat, corrugated are being disposed. Also, there are 220,000 coastal fishing vessels and 100,000 leisure yachts being disposed of and part of these are being abandoned illegally. The large volume of scrapped material is presenting a big problem. From the standpoint of global environmental protection, FRP will not decompose semipermanently when buried in the ground, and when incinerated, the atmosphere is contaminated with waste gas. In addition heavy metals, etc. in concentrated residues can cause secondary pollution problems, etc. In this way, difficult to crush plastics or FRP are widely used in various industries but there are no thorough measures to cope with scrapped materials hereafter and also, no processing technology and method have been established yet.

SUMMARY OF THE INVENTION

From the standpoint of pollution control and effective recycling of material resources, this invention is an extremely effective means and by being able to readily pulverize scrapped materials of FRP, it can be recycled as raw material the object being to put recycling into practical use by, for example, combining with inorganic material of the cement group or with FRP, etc.

In developing this invention, the following points had to be satisfied. Firstly, no secondary pollution was to be created. Secondly, the powder had to have all the physical conditions needed for recycling. Thirdly, the invention had to be able to effectively pulverize all materials. As it is the purpose to recover FRP as powder, the method of pulverizing mechanically was selected without utilizing incineration or decomposition by heating and dissolving chemically with chemicals. However, in evaluating various types of general pulverizers being widely used, the conclusion reached was that none were adequate for pulverizing FRP. In other words, in the method of crushing by impact, for example, a hammer mill, it was found that it was possible to break up the material but impossible to make the material into powder. On the other hand, in the method of crushing by compression, for example, a stamping mill, it was found that it is possible to deform the material but impossible to break up the structure and not possible to achieve the above purpose.

The inventor of this invention perceived using a grinding process untried to date as a means for completely pulverizing/ recovering difficult to crush plastics or FRP, under a pollution-free condition. Generally, in a grinding process, a predetermined amount of the surface of the material to be processed is accurately removed and the purpose is to finish the material surface to specified dimensions and make it smooth. The removed material powder becomes a waste.

However, the inventor took an opposite approach in having all the above material ground totally into a powder. The invention based on this new concept provides a pollution free pulverizing method and apparatus for effectively pulverizing difficult to crush plastic materials or FRP.

This applied invention of a method for pulverizing scrapped FRP materials is composed of rotating at high speed a diamond wheel having dense diamond particles of rough grain sizes of more than 270 mesh disposed on protrusions on the outer surface thereof, said protrusions being separated by diamond void grooves, pressing said scrapped FRP materials against said wheel surface thereby dry grinding said scrapped FRP materials into a fine powder wherein a substantial number of powder particles have a particle size of less than about 200 microns, and blowing ionic air ionized by high voltage corona discharge against said wheel surface thereby eliminating the static electricity of said fine powder and cooling said wheel.

Also, this applied invention of an apparatus for pulverizing scrapped FRP materials is composed of a diamond wheel having diamond particles of rough grain sizes of more than 270 mesh densely adhered to protruding sections of the outer surface of the wheel with diamond void grooves positioned between adjacent protrusions, means for rotating the diamond wheel, means for pressing scrapped FRP materials against the outer surface of the diamond wheel thereby grinding said scrapped FRP materials into a fine powder wherein a substantial number of powder particles have a particle size of less than about 200 microns, means for blowing ionic air ionized by high voltage corona discharge against said wheel surface thereby eliminating the static electricity of said fine power and cooling said wheel, and means for collecting said fine powder.

By the pulverizing method of this application, the scrapped FRP materials together with the reinforcing fibers of glass fiber and also the thermosetting plastics included in the materials can be efficiently pulverized simultaneously in a single process into a fine powder of appropriate grain size and grain distribution for the purpose of recycling. Also, by the pulverizing apparatus of this application, difficult to crush plastic materials, i.e., FRP, are pushed against the outer surface of the diamond wheel by a means for pressing and are efficiently pulverized, and the FRP powder produced is efficiently collected by the powder collector.

Furthermore, blowing of ionized air eliminates static electricity generated on the fine pulverized powders of plastic powder liable to be statically charged, and allows the diamond wheel to cool.

The elimination of static electricity prevents the fine powder described above from adhering onto the interiors of the diamond wheel, dustproof cover, means for collecting fine pulverized powders such as a transfer hose of the present apparatus, as well as makes the flowability of the powder better, making it easy to collect the powder. Moreover, this elimination, which can also prevent the fine pulverized plastic powders from floating in the interior of the means for collecting fine pulverized power, avoids the danger of a dust explosion.

By allowing the diamond wheel to cool, an increase in the temperature of the diamond wheel due to friction between the diamond wheel and the plastic material is suppressed, making it possible to continuously run the pulverizing apparatus over a prolonged period of time.

The terminology "scrapped materials" used herein is to be understood to include both scrapped materials and materials which will be scrapped.

Examples of the invention of this application are described as follows. Firstly, the reason for using diamond for pulverization was that, the hardness of thermosetting resins reinforcing by glass fiber or carbon fiber is extreme and when using the grinding wheel with general abrasive grains, such as alumina (WA), carborundum (GC), cubic boron nitride, etc., the wear the grinding wheel is very great and not only does it need to be replaced frequently but such grinding wheel is inadequate from the standpoint of productivity and economics. In addition as large amounts of grinding grits become mixed with the powder product, it was found that it presented a problem in the quality of the recycled powder. For the types of diamond grits, the industrial type natural diamond or synthetic diamond being currently sold can be used.

On the other hand, in regard to the grain size of the diamond grit, as a result of testing various sized diamond grits, great variation was found in the grain distribution of the fine pulverized powders produced and the pulverizing efficiency. In grinding with a wheel which has large grained diamond grits, the grain size of the powder produced was rough and the smaller the grit size, the finer the grain size of the powder produced. Therefore, in case of the grit size being smaller than 270 mesh (53 microns), the powder became too fine and took too much time to pulverize and was found thus to be ineffective.

Also, in regard to the construction of the diamond wheel, a wheel with diamond grit densely adhered on to the surface of metal, ceramic, resin, etc. base wheels by electroplating, deposition and sintering methods is recommended. By making the diamond wheel with these constructions, it is possible to put numerous diamond grits on the surface which becomes the cutting blade to efficiently pulverize the plastic materials. In overlooking efficiency slightly, it is possible to use general diamond wheels with diamond grit bonded with resin, metal and vitrified type bonds, etc. to carry out pulverizing in the same manner as above.

Furthermore, by putting suitable concaves such as spirals on the outer surface of the wheel, without any clogging of the outer surface of the wheel, fine pulverized powders can be quickly and continuously produced and recovered.

The pulverizing apparatus of this application, shown in the figure as one example, by bundling scrapped FRP material cut to size to fit into the feed entrance on the dustproof cover of the pulverizer and pressing said FRP material against the rotating diamond wheel and further by grinding the material into powder by the force of the diamond wheel. By adjusting the pressing pressure of the pushing unit, the feed speed of the material and the powder grain size can be controlled. Also, in order to increase the recovery efficiency of FRP powder and to protect the operator from the effects of powder, a dustproof cover and powder collector as described above are incorporated. Furthermore, to separate powder from non-powder in regards to crushed edgings material and cotton like glass fibers, a filter can be installed in the powder collector or a separator such as a separating tank can be placed between the pulverizing compartment and powder collector. Also, should the suction capability of the powder collector be strong, the dustproof cover can be changed to a simple wheelcover to observe the pulverizing operations and in case the suction is weak, an air curtain can be installed at the scrapped material feeding entrance to prevent powder from scattering outside. In addition, the air supplied to the air curtain can be utilized for cooling the diamond wheel.

It is very effective to install a static electricity eliminator which has air nozzles facing the outer surface of the diamond wheel inside the above dustproof cover and which blows ionic air with ions ionized by high voltage corona discharge through the nozzle. The blown ionic air-eliminates the static electricity and, therefore, adhesion of powder onto the wheel and inside the dustproof cover is prevented and also, the wheel is cooled by the blown air.

BRIEF DESCRIPTION OF THE DRAWINGS

Other features and advantages of the present invention will be apparent from the following description taken in connection with the accompanying drawings, wherein:

FIG. 3a is elevation partly in section of the wheel, FIG. 3b is partially sectional view of outer surface, FIG. 3c is a side view of mounting hole.

DESCRIPTION OF THE PREFERRED EMBODIMENTS

Embodiments of this invention will now be described by referring to the attached drawings.

Figure 1:
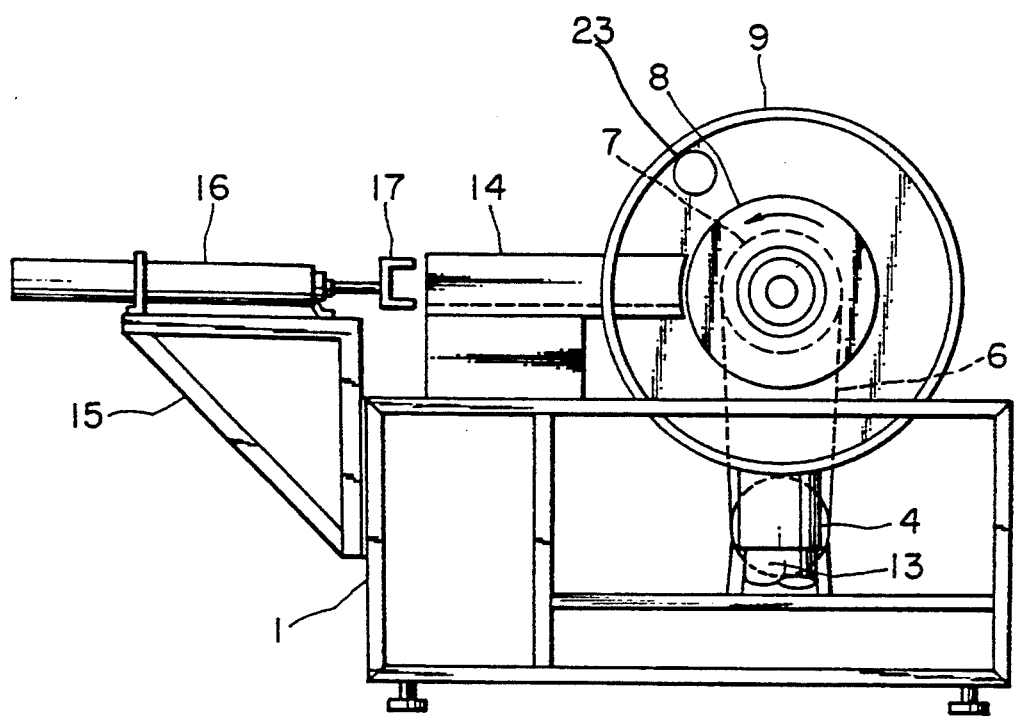
FIG. 1 is a front view of the pulverizing apparatus of this application with the lid of the dustproof cover removed.
Figure 2:
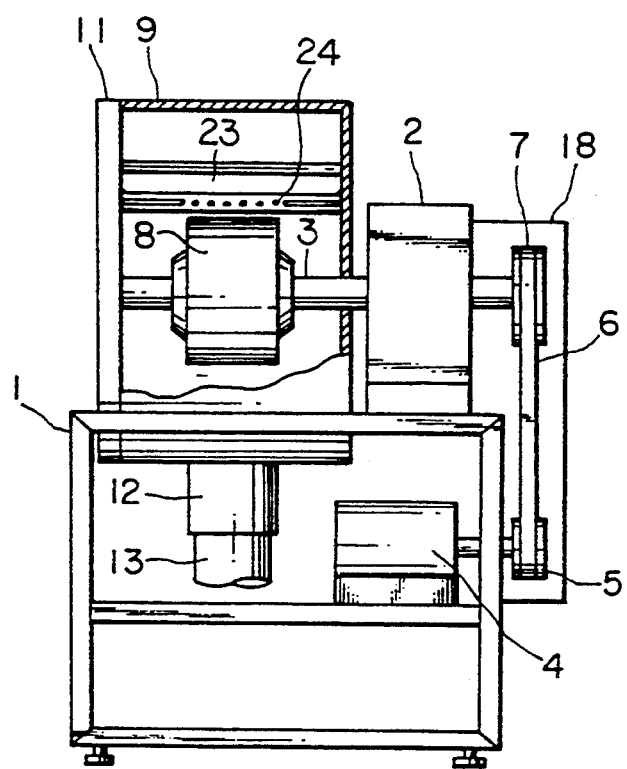
FIG. 2 is a side view of the pulverizing apparatus shown in FIG. 1 with a part of the dustproof cover removed.

In FIG. 1 and FIG. 2, a wheel spindle 3 by supported spindle stock 2 which is on the top of the frame 1 of the apparatus is rotated by the motor 4, motor pulley 5, belt 6 and spindle pulley 7. The diamond wheel 8 is fixed on to the spindle 3, wheel 8 is covered by the dustproof cover consisting of dustproof cover body 9 and lid 11, the duct 12 is placed on the bottom of the dustproof cover and through the duct 12 and hose 13, the powder is collected by the powder collector connected to it.

Also, the table 14 on which the scrapped FRP material is placed on to the frame 1 facing the outer surface of the wheel 8 and at the inner edge of this table 14, the material feed entrance is located on the side of the dustproof cover body 9 above and the inner edge of the table 14 is put inside the dustproof cover through this entrance and placed close to the outer surface of the wheel 8. Furthermore, the air cylinder support 15 and air cylinder 16 are attached to the side of frame 1 and with the pushing unit 17 fixed on to the tip of the piston of air cylinder 16, and the scrapped materials of FRP placed on the table 14 are pressed against the outer surface of the diamond wheel 8. Furthermore, the pulley cover 18 covers the motor pulley 5, belt 6 and spindle pulley 7.

A static electricity eliminator 23 blows ionic air ionized by high voltage corona discharge through nozzles 24 against said wheel surface thereby to eliminating the static electricity of said powder and cooling said wheel.

Figures 3A, 3B, 3C:
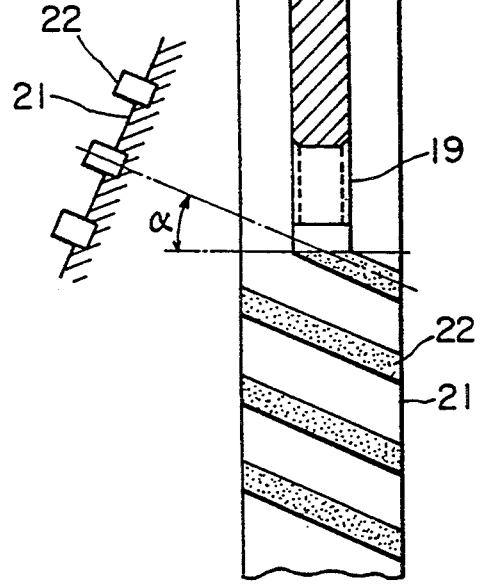
FIGS. 3a, 3b, 3c are detailed views of the diamond wheel used in this invention.

Next, FIGS. 3a, 3b, 3c are descriptive figures of the diamond wheel 8 and FIG. 3a is a cross-sectional view of a part of the wheel, FIG. 3b is a cross-section view of the wheel surface, FIG. 3c is a side view of the wheel mounting hole 19. The base materials of the wheel 8 are metal, ceramic, resin, etc. and in order to form a groove 21 to create concave effects on the outer surface, numerous spiral shaped twisted angle α protrusions 22 are placed on the wheel, and diamond particles of grain size of more than 270 mesh are densely adhered on to the surface of protrusions 22 by electro-plating, deposition or sintering processes. Also, the width of the groove 21 compared to protrusions 22 is made narrower than shown in the figure and on the other hand, by making the twisted angle α suitably larger, even if the material is a sheet, the tip of the sheet will not get caught in the groove 21, and thus enable good pulverization to be carried out.

As the pulverizing apparatus of this invention is constructed as per above, the scrapped FRP materials placed on the table 14 are pressed against the outer surface of the diamond wheel 8 by the air cylinder 16 and pushing unit 17 for pulverization and the powder produced by pulverization passes through the duct 12, hose 13 and is ultimately collected by the attached powder collector system.

The following shows a concrete example.

EXAMPLE ONE

A diamond wheel (260 mm dia.×70 mm) using industrial natural diamond grits of 30-40 mesh (420-600 micron) was tested.

The wheel was attached to the pulverizing apparatus (2HP electric motor) shown in FIG. 1, FIG. 2, rotated at 500 rpm, and scrapped FRP sheet material, size 50×400 mm, bundled to approx. 30-40 mm thick was placed on the table 14, and said material was pressed against the outer surface of the diamond wheel 8 by the air cylinder 16 at approx. 100 mm per min. so producing a power. The grain size of the powder obtained is as per Table 1 and it was found that the majority was pulverized into powder of less than 74 microns. Under this operating condition, approx. 3 kg of powder was produced per hour.

TABLE 1

| Grain Size (μm) | Powder Grain Size Distribution | | | | | | |
|---|---|---|---|---|---|---|---|
| | ≧297 | 297~210 | 210~149 | 149~105 | 105~74 | 74~44 | ≦44 |
| Percentage (%) | 0.6 | 0.5 | 2.3 | 5.2 | 6.5. | 74.2 | 10.7 |

EXAMPLE TWO

A diamond wheel (250 mm dia.×140 mm) using industrial natural diamond grits of 16-18 mesh (1,000-1,200 micron) was prepared, the pulverizing apparatus shown in FIG. 1, FIG. 2, was partially modified (5 HP electric motor) and the pulverizing operation was carried out under the same condition as Example One.

As a result of the test, the grain size of the powder was as per Table 2 and compared to Example One, it was found that it became coarser. As for pulverizing efficiency, approx. 9 kg of powder was produced per hour, and compared with the diamond wheel of Example One, the width of the wheel was twice as wide. In both Example One and Example Two, the heat generated by the friction between the diamond grit and scrapped material is absorbed and diffused by the high heat conduction of the diamond grits and also, due to the cooling effect of the inflow of air by the suction power of the powder collector system or air of the air curtain, the temperature rise of the diamond wheel was hardly recognizable.

TABLE 2

| Powder Grain Size Distribution | | | | | | |
| --- | --- | --- | --- | --- | --- | --- |
| Grain Size (μm) | 2297 | 297~210 | 210~105 | 105~74 | 74~44 | ≦44 |
| Percentage (%) | 0.8 | 4.6 | 55.7 | 24.9 | 11.0 | 2.9 |

While the invention has been particularly shown and described with reference to preferred embodiments thereof, it will be understood by those skilled in the art that the foregoing and other changes in form and details can be made therein without departing from the spirit and scope of the invention.

What is claimed is:

1. A method for pulverizing scrapped fiber reinforced thermosetting plastic materials comprising:

rotating at high speed a diamond wheel having dense diamond particles of rough grain sizes of more than 270 mesh disposed on protrusions on the outer surface thereof, said protrusions being separated by diamond void grooves:

pressing said scrapped fiber reinforced thermosetting plastic materials against said wheel surface thereby to dry grind said scrapped fiber reinforced thermosetting plastic materials into a fine powder wherein a substantial number of powder particles have a particle size of less than about 200 microns; and blowing ionic air ionized by high voltage corona discharge against said wheel surface thereby eliminating the static electricity of said fine powder and cooling said wheel.

2. An apparatus for pulverizing scrapped fiber reinforced thermosetting plastic materials comprising:

a diamond wheel having diamond particles of rough grain sizes of more than 270 mesh densely adhered to protruding sections of the outer surface of the wheel with diamond void grooves positioned between adjacent protrusions;

means for rotating the diamond wheel;

means for pressing scrapped fiber reinforced thermosetting plastic materials against the outer surface of the diamond wheel thereby grinding said scrapped fiber reinforced thermosetting plastic materials into a fine powder wherein a substantial number of powder particles have a particle size of less than about 200 microns;

means for blowing ionic air ionized by high voltage corona discharge against said wheel surface thereby eliminating the static electricity of said fine powder and cooling said wheel; and means for collecting said fine powder.

* * * * *